E. L. JONES.
LIQUID METER.
APPLICATION FILED AUG. 12, 1920.

1,437,806.

Patented Dec. 5, 1922.

INVENTOR
Essis L. Jones.
BY
ATTORNEY

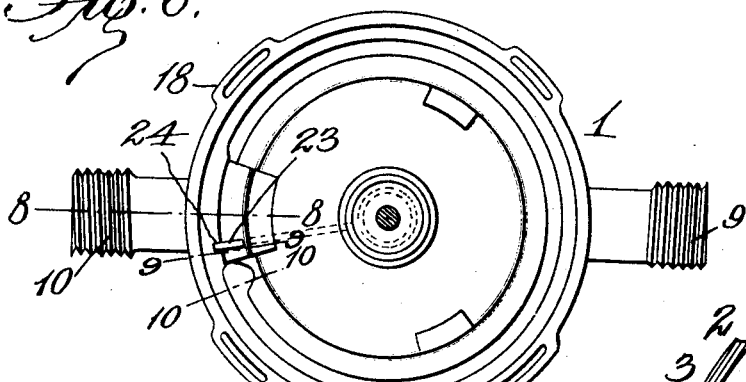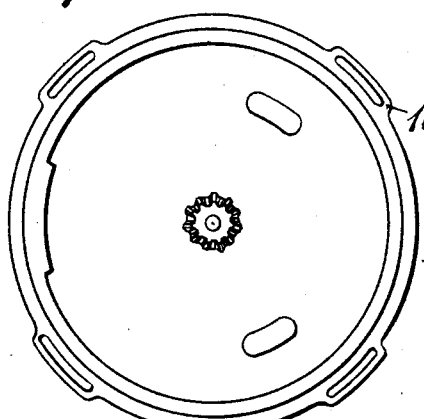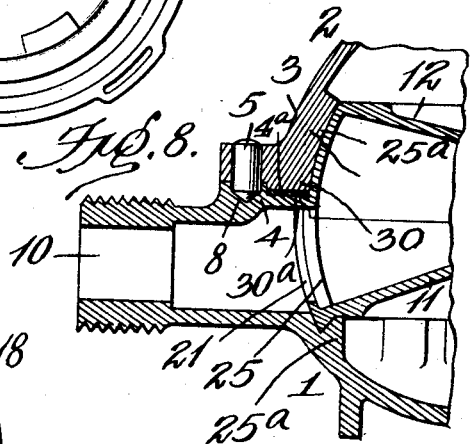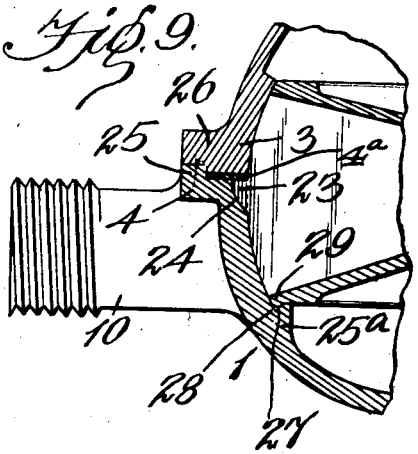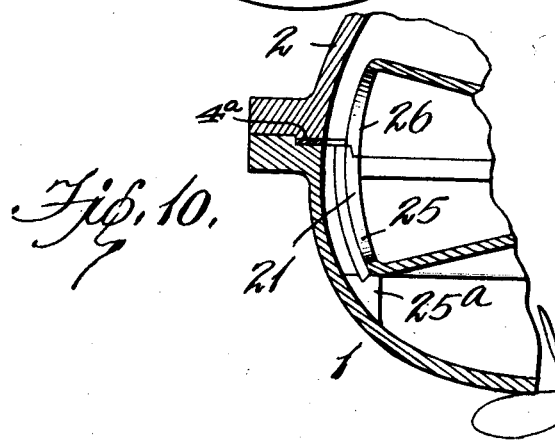

Patented Dec. 5, 1922.

1,437,806

UNITED STATES PATENT OFFICE.

ELLIS L. JONES, OF LONG ISLAND CITY, NEW YORK.

LIQUID METER.

Application filed August 12, 1920. Serial No. 403,082.

*To all whom it may concern:*

Be it known that I, ELLIS L. JONES, a citizen of the United States, and resident of Long Island City, in the State of New York, have invented certain new and useful Improvements in Liquid Meters, of which the following is a specification.

This invention relates to new and useful improvements in liquid meters of the type shown in my co-pending application Serial No. 383,265, filed May 21, 1920, and the invention pertains more particularly to sealing devices for the measuring chamber of such liquid meters.

The principal object is to provide a device of this class in which beveled and segmental projections shall be held in such intimate connection as to effectually seal the outlet of the chamber to the passage of liquid unless the same has passed through the proper channel and been measured.

Another object is to so construct the device that unusual longitudinal strains will not separate the abutting faces of the seal.

A still further object of the invention is to provide a novel and effective outlet seal for liquid meters wherein leakage between the parts at said outlet will be positively prevented, the construction of the seal being such that the measuring chamber is free to slide horizontally with relation to the inlet side of the main casing of the meter without disturbing the seal; and the combination between this feature of construction and means for securing the sections of the main casing together so as to resist any separation of the seal from the main casing incident to sliding action of the said measuring chamber.

Another object of the invention is to provide effective means for anchoring the upper member of the main casing so that the center of said member and the center of the measuring chamber will be positively maintained against longitudinal strains to thereby assure the highest measure of accuracy when the meter is in operation.

Other objects will appear from the following description and claims. All if these objects are attained by means of the mechanism illustrated in the accompanying drawing in which:—

Figure 6 is a plan view of the device with the upper portion of the main casing removed.

Figure 7 is a view looking up into the upper portion of the main casing.

Figure 8 is a fragmentary vertical sectional view taken substantially on the line 8—8 of Fig. 6.

Figure 9 is a similar view taken on line 9—9 of Figure 6.

Figure 10 is a similar view taken on line 10—10 of Figure 6.

Like characters of reference refer to like parts throughout the several views.

Figure 1:
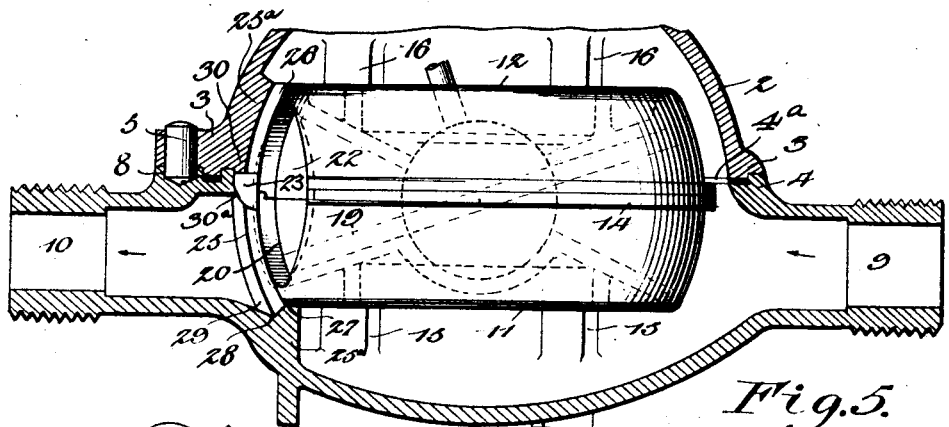
Figure 1 is a section through the device showing the measuring chamber in full lines.

Referring to the drawings, 1 represents the lower portion and 2 the upper portion of the main casing, which portions are provided with suitable flanges 3 and 4 that have a gasket 4ª interposed between them.

A dowel pin 5 carried by the upper member 2 fits into an aperture or dowel seat 8 formed in the lower member 1 and anchors the members 1 and 2 against movement incident to longitudinal strains and friction caused by atmospheric action. The lower member 1 is provided with an externally threaded inlet portion 9 and with a similar outlet portion 10 as shown in Figure 1.

The measuring chamber comprises lower and upper portions 11 and 12 which are formed with co-acting flanges 13 and 14 so as to prevent relative lateral movement. Lugs 15 are formed up on the interior of member 1 upon which the member 11 rests; and similar lugs 16 depend from the member 2 into contact with the member 12 so as to lock the members 11 and 12 in engagement with each other.

Figures 4, 5:
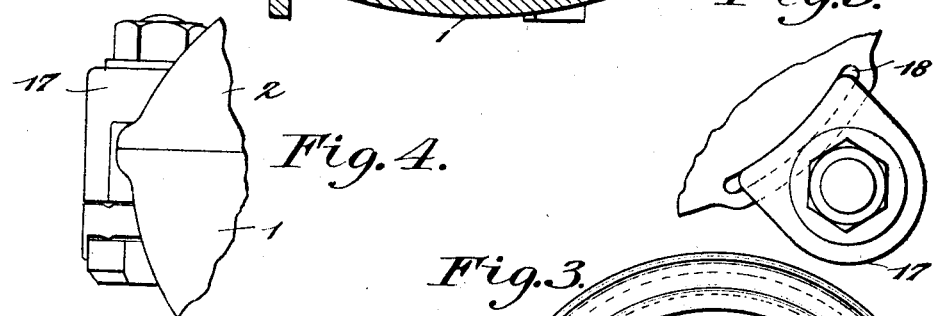
Figure 4 is a side view of a portion of the main casing.
Figure 5 is a plan view of a portion of said main casing.

Clamps 17 of the type shown in Figure 4 grip the upper and lower members 1 and 2 upon lugs or bosses 18 so as to hold the members of the casing and the measuring chamber in engagement.

A nutating piston 19 is mounted in the measuring chamber, and is operated by liquid passing into the measuring chamber from the casing through an inlet port 20 formed in the measuring chamber around the inside of the measuring chamber and out through an outlet port 21 in the measuring chamber which outlet port registers with the outlet portion 10 of the main casing. A diaphragm or partition 22 in the measuring chamber forces the liquid to make the proper circuit through the measuring chamber. The diaphragm is provided with a lug 23 which is adapted to seat itself in a groove 24 formed in the lower portion of the main casing, and thereby locate the ports of the measuring chamber relatively to those of the main casing.

Figures 2, 3:
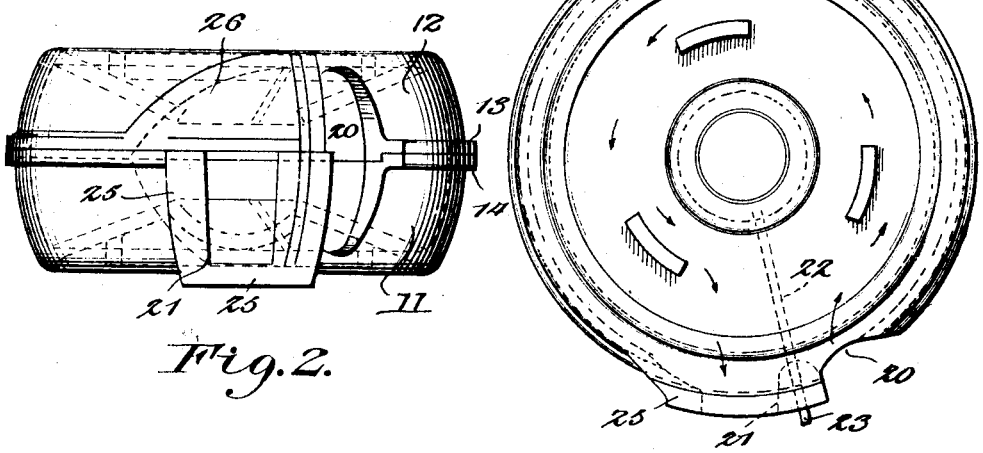
Figure 2 is a side view of the measuring chamber.
Figure 3 is a plan view of the measuring chamber.

A segmental projection 25 is formed on the lower portion of the measuring chamber, and in this projection is located the outlet port 21. A segmental projection 26 formed on the upper portion of the measuring chamber overlies the projection 25 as shown in Figure 2. Formed on the inside of the lower and upper members of the main casing are bosses 25ª, the boss on the lower member providing a seat 27 into which the projection of the measuring chamber is adapted to extend, and which seat encloses the sides and bottom of the outlet port of the main casing. The lower portion of the seat 27 is formed with a bevel or V-shaped groove 28 and the projection 25 has its lower end beveled or V-shaped face 29 adapted to be seated in the groove 28. A lug 30 formed out on the upper portion of the main casing is adapted to seat itself against flange 30ª of the segmental projection 26 so as to lock the V-shaped elements in engagement with each other thereby securely attaching the measuring chamber with its outlet port in intimate contact with the outlet port of the main casing.

It will be readily seen that the above described co-acting projections and seats form an effective means of securing and sealing the measuring chamber to the main casing so that the liquid may not escape through the casing outlet without passing through the measuring chamber. It will also be seen that if the device is subjected to varying degrees of temperature or if from other causes relative movement occurs between the casing and the measuring chamber that the outlets will remain sealed to each other and that there will be merely relative sliding between the members of the measuring chamber and lugs 15 and 16.

While I have described what I deem to be the preferred embodiment of my invention, it is obvious that various details may be varied without in any way departing from the spirit of my invention; and I, therefore, do not wish to be considered as limiting myself to the exact details of construction herein set forth, nor to anything less than the whole of my invention limited only by the appended claims.

What I claim as my invention is:

1. In a device of the class described, the combination of a measuring chamber provided with inlet and outlet ports, a main casing having inlet and outlet ports, and means for holding the outlet port of the measuring chamber fixed with relation to the corresponding port of the main casing and in sealed contact therewith, the measuring chamber having its walls spaced from the walls of the main casing except at said outlet ports so that under the office of the said holding means; the measuring chamber is free to move under the action of varying degrees of temperature without causing relative separation of said outlet ports.

2. In a device of the class described, the combination of a measuring chamber provided with inlet and outlet ports and with a segmental projection surrounding one of said ports, and a main casing comprising a seat co-acting to maintain said projection in contact with one side of said main casing.

3. In a device of the class described, the combination of a measuring chamber provided with inlet and outlet ports and with a projection having an angular locking face, and a main casing comprising an angular seat co-acting with said locking face to maintain one of said ports of said measuring chamber in register with a similar port of said main casing.

4. In a device of the class described, the combination of a measuring chamber provided with inlet and outlet ports and a segmental projection having an angular locking face, and a main casing comprising an angular seat co-acting with said angular locking face to maintain one of said ports of said measuring chamber in register with a similar port of said main casing.

5. In a device of the class described, the combination of a measuring chamber provided with inlet and outlet ports and a projection having an angular locking face, and a main casing comprising an angular seat and lug for forcing said angular locking face into said seat to maintain one of the ports of said measuring chamber in register with a similar port of said main casing.

6. In a liquid meter, the combination of upper and lower main casing members, a dowel pin for effecting perfection of registration of said members with each other, a measuring chamber comprising upper and lower sections supported and held in engagement by lugs formed on the interior of said main casing, an outlet port in one of said casing members, an outlet port in one of the members of said measuring chamber, and means for securing said chamber and casing together at said outlet ports while permitting relative movement of the same at other portions.

7. In a liquid meter, the combination of a main casing, a measuring chamber supported in said main casing, said main casing and measuring chamber being each provided with inlet and outlet ports and one being provided with a segmental projection and the other with a seat for said projection, and means for locking said segmental projection into said seat and thereby sealing one of the ports of said measuring chamber in contact with one of the ports of said main casing.

8. In a liquid meter, the combination of a main casing, a measuring chamber supported in said main casing, said main casing and measuring chamber being each provided with inlet and outlet ports and one being provided with a V-shaped face and the other with a V-shaped groove, and means for forcing said V-shaped face into said groove, the face and said groove serving to seal one of said ports of the measuring chamber in contact with one of the ports of said main casing.

9. In a liquid meter, the combination of a main casing, a measuring chamber supported in said main casing, said main casing and measuring chamber being each provided with inlet and outlet ports and said main casing being also provided with a seat, and a diaphragm mounted in said measuring chamber and provided with a lug adapted to extend into said seat in said main casing for bringing one of the ports of said measuring chamber into accurate registration with one of the ports of said main casing.

10. In a liquid meter, the combination of a main casing, a measuring chamber supported in said main casing, the main casing comprising separable sections, means on the measuring chamber clamped directly between the sections of said main casing, the chamber and casing respectively provided with inlet and outlet ports held in mating relation by said means.

Signed at New York, in the county of New York and State of New York, this 7th day of May, A. D. 1920.

ELLIS L. JONES.